(12) United States Patent
Yoo et al.

(10) Patent No.: US 7,738,071 B2
(45) Date of Patent: Jun. 15, 2010

(54) METHOD OF FORMING FINE PATTERN, LIQUID CRYSTAL DEVICE HAVING A FINE PATTERN AND FABRICATING METHOD THEREOF

(75) Inventors: Soon Sung Yoo, Gunpo-si (KR); Oh Nam Kwon, Yongin-si (KR); Heung Lyul Cho, Suwon-si (KR); Seung Hee Nam, Suwon-si (KR)

(73) Assignee: LG. Display Co., Ltd., Seoul (KR)

( * ) Notice: Subject to any disclaimer, the term of this patent is extended or adjusted under 35 U.S.C. 154(b) by 790 days.

(21) Appl. No.: 11/473,590

(22) Filed: Jun. 23, 2006

(65) Prior Publication Data

US 2007/0001979 A1 Jan. 4, 2007

(30) Foreign Application Priority Data

Jun. 30, 2005 (KR) .................. 10-2005-0058475

(51) Int. Cl.
*G02F 1/1343* (2006.01)
*G02F 1/139* (2006.01)
*C30B 33/00* (2006.01)

(52) U.S. Cl. .................. 349/187; 349/141; 216/23

(58) Field of Classification Search .................. 349/141, 349/187; 438/30; 216/23, 24, 42, 101, 108; 430/5, 321

See application file for complete search history.

(56) References Cited

U.S. PATENT DOCUMENTS

| | | | |
|---|---|---|---|
| 5,162,933 A | 11/1992 | Kakuda et al. | |
| 5,317,433 A | 5/1994 | Miyawaki et al. | |
| 5,339,181 A | 8/1994 | Kim et al. | |
| 5,462,887 A | 10/1995 | Gluck | |
| 5,668,379 A | 9/1997 | Ono et al. | |
| 5,731,856 A | 3/1998 | Kim et al. | |
| 5,771,083 A | 6/1998 | Fujihara et al. | |
| 5,793,460 A | 8/1998 | Yang | |
| 5,847,781 A | 12/1998 | Ono et al. | |
| 6,632,709 B2* | 10/2003 | Ayres et al. | 438/149 |
| 6,682,658 B2* | 1/2004 | Ahn et al. | 216/6 |
| 6,762,813 B1* | 7/2004 | Zhang et al. | 349/141 |
| 6,765,642 B2* | 7/2004 | Lee | 349/141 |
| 6,784,966 B2* | 8/2004 | Maeda et al. | 349/141 |
| 6,914,039 B2* | 7/2005 | Ishikawa et al. | 510/176 |
| 2002/0017665 A1* | 2/2002 | Lyu et al. | 257/288 |
| 2003/0049876 A1* | 3/2003 | Mori et al. | 438/23 |
| 2003/0107023 A1* | 6/2003 | Chae et al. | 252/79.1 |
| 2003/0184688 A1* | 10/2003 | Kim | 349/43 |
| 2004/0027524 A1* | 2/2004 | Shiota et al. | 349/129 |
| 2005/0007535 A1* | 1/2005 | Hirakata et al. | 349/141 |
| 2006/0063369 A1* | 3/2006 | Lu et al. | 438/618 |
| 2007/0001961 A1* | 1/2007 | Yoo et al. | 345/94 |

* cited by examiner

*Primary Examiner*—Dung Nguyen
*Assistant Examiner*—Tai Duong
(74) *Attorney, Agent, or Firm*—Brinks Hofer Gilson & Lione

(57) ABSTRACT

This invention relates to a method of forming fine pattern that is adaptive for forming a fine pattern without limit of an exposure resolution, a liquid crystal display device and a fabricating method. The method of forming fine pattern comprises forming a photo-resist pattern on a transparent conductive layer. The photo-resist pattern having a minimum line width corresponding to an exposure resolution of an exposure device. The method further comprises over-etching the transparent conductive layer by an etching process using the photo-resist pattern as a mask to form an electrode pattern having a line width narrower than the exposure resolution of the exposure device.

15 Claims, 14 Drawing Sheets

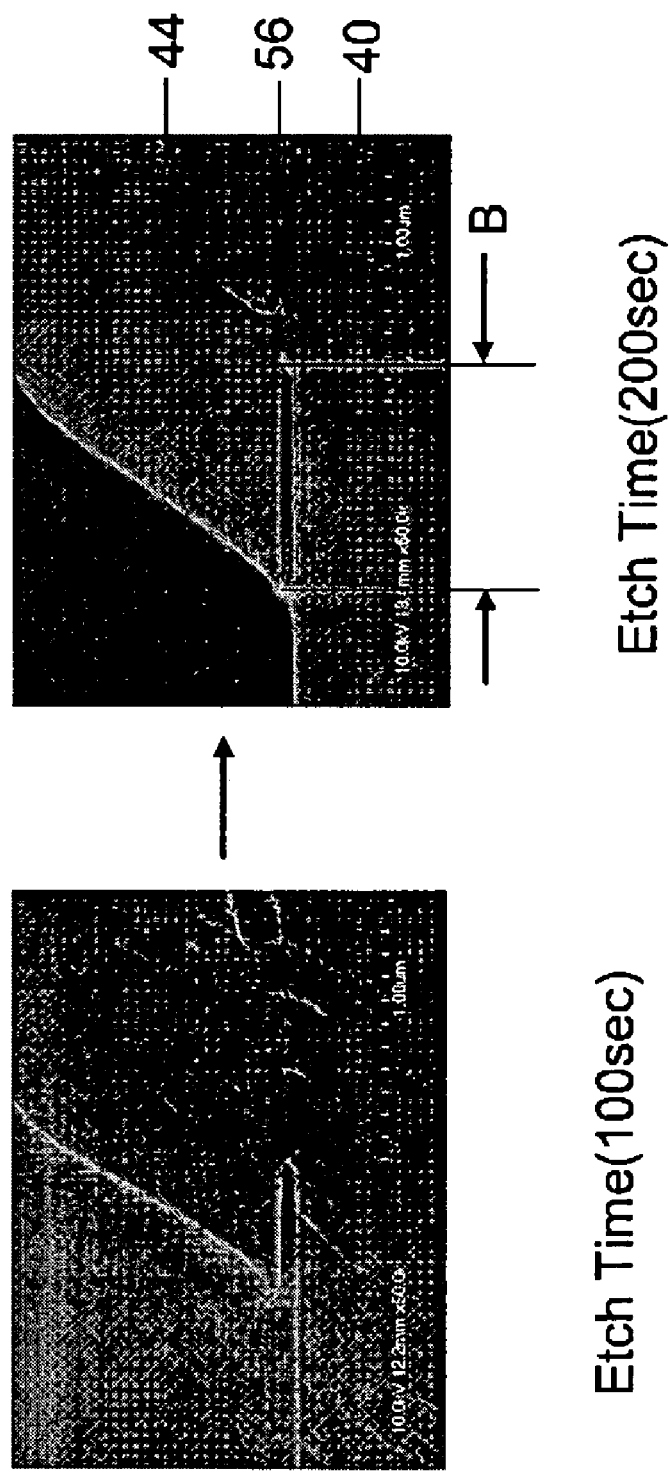

US 7,738,071 B2

METHOD OF FORMING FINE PATTERN, LIQUID CRYSTAL DEVICE HAVING A FINE PATTERN AND FABRICATING METHOD THEREOF

This application claims the benefit of Korean Patent Application No. P2005-058475 filed in Korea on Jun. 30, 2005, which is hereby incorporated by reference.

FIELD

This invention relates to a liquid crystal display device, and more particularly to a method of forming fine pattern that is adaptive for forming a fine pattern, a liquid crystal display device and a fabricating method thereof using it.

BACKGROUND

Generally, a liquid crystal display device (LCD) controls light transmittance of a liquid crystal having a dielectric anisotropy using an electric field to thereby display a picture. To this end, the LCD includes a liquid crystal display panel for displaying a picture by a liquid crystal cell matrix, and a driving circuit for driving the liquid crystal display panel.

Referring to FIG. 1, a related art liquid crystal display panel is comprised of a color filter substrate 10 and the thin film transistor substrate 20 that are joined to each other with a liquid crystal 24 therebetween.

The color filter substrate 10 includes a black matrix 4, a color filter 6 and a common electrode 8 that are sequentially provided on an upper glass substrate 2. The black matrix 4 is provided in a matrix type on the upper glass substrate 2. The black matrix 4 divides an area of the upper glass substrate 2 into a plurality of cell areas to be provided with the color filter 6, and prevents a light interference between adjacent cells and an external light reflection. The color filter 6 is provided at the cell areas divided by the black matrix 4 in such a manner to be divided into red(R), green(G) and blue(B) ones, thereby transmitting red, green and blue lights. The common electrode 8 is formed from a transparent conductive layer entirely coated onto the color filter 6, and supplies a common voltage Vcom that serves as a reference voltage upon driving of the liquid crystal 24. Further, an over-coated layer (not shown) for smoothing the color filter 6 may be provided between the color filter 6 and the common electrode 8.

The thin film transistor substrate 20 includes a thin film transistor 18 and a pixel electrode 22 provided for each cell area defined by an intersection between a gate line 14 and a data line 16 at a lower glass substrate 12. The thin film transistor 18 applies a data signal from the data line 16 to the pixel electrode 22 in response to a gate signal from the gate line 14. The pixel electrode 22 formed from a transparent conductive layer supplies a data signal from the thin film transistor 18 to drive the liquid crystal 24.

The liquid crystal 24 having a dielectric anisotropy is rotated in accordance with an electric field formed by a data signal from a pixel electrode 22 and a common voltage Vcom from the common electrode 8 to control light transmittance to implement a gray scale level.

Further, the liquid crystal display panel includes an alignment film for initial aligning the liquid crystal 24, and a spacer (not shown) for constantly keeping a cell gap between the color filter substrate 10 and the thin film transistor substrate 20.

In such the liquid crystal display panel, the color filter substrate 10 and the thin film transistor substrate 20 are formed by a plurality of mask processes. Herein, one mask process includes a lot of processes such as thin film deposition (coating), cleaning, photolithography, etching, photo-resist stripping and inspection processes, etc.

Particularly, since the thin film transistor substrate includes the semiconductor process and requires the plurality of mask processes, it has a complicate fabricating process to act as a major factor in the manufacturing cost rise of the liquid crystal display panel. Therefore, the thin film transistor substrate has been developed toward a reduction in the number of mask process from a five-round mask process that is a standard mask process.

Meanwhile, the liquid crystal display devices are largely classified into a vertical electric field applying type and a horizontal electric field applying type depending upon a direction of the electric field driving the liquid crystal.

The liquid crystal display device of vertical electric field applying type drives a liquid crystal in a twisted nematic (TN) mode with a vertical electric field formed between a pixel electrode and a common electrode arranged in opposition to each other on the upper and lower substrate. The liquid crystal display device of vertical electric field applying type has an advantage of a large aperture ratio while having a drawback of a narrow viewing angle about 90°.

The liquid crystal display device of horizontal electric field applying type drives a liquid crystal in an in-plane switching (IPS) mode with a horizontal electric field between the pixel electrode and the common electrode arranged in parallel to each other on the lower substrate. The liquid crystal display device of horizontal electric field applying type has an advantage of a wide viewing angle about 160°.

But, in the liquid crystal display device of horizontal electric field applying type, the pixel electrode and the common electrode are formed from a plurality of finger images at each pixel area, so that the liquid crystal display device of horizontal electric field applying type has a drawback of a small aperture ratio. A line width of the pixel electrode and the common electrode must be decreased in order to increase the aperture ratio, but it is limited by an exposure resolution in the photolithography process.

FIG. 2A to FIG. 2C are sectional views showing a method of forming a related art transparent electrode.

Referring to FIG. 2A, a transparent conductive layer 42 is formed on a substrate 40, and a photo-resist pattern 44 is formed on the transparent conductive layer 42. In this case, it is difficult to have a minimum line width of the photo-resist pattern 44 much smaller than the exposure resolution of an exposure element. For example, when a photo resolution of a scan type is approximately 4 μm, it is impossible that a minimum line width of the photo-resist pattern 44 is smaller than 4 μm.

And, referring to FIG. 2B and FIG. 2C, the transparent conductive layer 42 is etched by the etching process, thereby providing a transparent electrode 46 overlapped with the photo-resist pattern 44, and the photo-resist pattern 44 is removed by the stripping process. In this case, the transparent electrode 46 is formed in such a manner as to have a narrower line width than the photo-resist pattern 44 by an etching CD (Critical Dimension) bias A, but when the minimum line width of the photo-resist pattern 44 is 4 μm, it is impossible that a line width of the electrode 46 is less than 3 μm.

Thus, the minimum line width of the pixel electrode and the common electrode of the liquid crystal display device of horizontal electric field applying type is limited by the exposure resolution. Thus, there is limit to improve the aperture ratio.

SUMMARY

Accordingly, it is an objective of the present invention to provide a method of forming fine pattern that is adaptive for forming a fine pattern without limit of an exposure resolution, a liquid crystal display device and a fabricating method thereof.

A method of forming fine pattern according to one aspect of the present invention comprises forming a photo-resist pattern on a transparent conductive layer. The photo-resist pattern has a minimum line width corresponding to an exposure resolution of an exposure device. The method further comprises over-etching the transparent conductive layer by an etching process using the photo-resist pattern as a mask to form an electrode pattern having a line width narrower than the exposure resolution of the exposure device such that an etching CD (Critical Dimension) bias between the photo-resist pattern and the electrode is allowed to be larger than 0.3 μm.

According to another aspect of the present invention, a method of fabricating a liquid crystal display device comprises forming a transparent conductive layer and forming a photo-resist pattern including a portion having a minimum line width corresponding to an exposure resolution of an exposure device placed on the conductive layer. The method further comprises over-etching the transparent conductive layer by an etching process using the photo-resist pattern as a mask to form the electrode pattern having a line width narrower than an exposure resolution of an exposure device such that an etching CD (Critical Dimension) bias between the photo-resist pattern and the electrode is allowed to be larger than 0.3 μm.

A liquid crystal display device using a method of forming the fine pattern according to another aspect of the present invention comprises a data line that crosses a gate line to define a pixel area and a thin film transistor connected to the gate line and the data line. The liquid crystal display device further comprises a pixel electrode connected to the thin film transistor in the pixel area and a common electrode along with the pixel electrode. The liquid crystal display device includes a common line connected to the common electrode. At least one of the pixel electrode and the common electrode is formed of a transparent conductive layer and in an electrode pattern having a line width narrower than an exposure resolution of an exposure device by an over-etching process using a photo-resist pattern as a mask such that an etching CD (Critical Dimension) bias between the photo-resist pattern and the electrode is allowed to be larger than 0.3 μm.

BRIEF DESCRIPTION OF THE DRAWINGS

These and other objectives of the invention will be apparent from the following detailed description of the embodiments of the present invention with reference to the accompanying drawings, in which:

FIG. 4A and FIG. 4B are photographs for comparing an etching CD bias by the method of forming transparent electrode of a related art and the present invention;

DETAILED DESCRIPTION

Hereinafter, the preferred embodiments of the present invention will be described in detail with reference to FIG. 3A to FIG. 7C.

Figure 1:
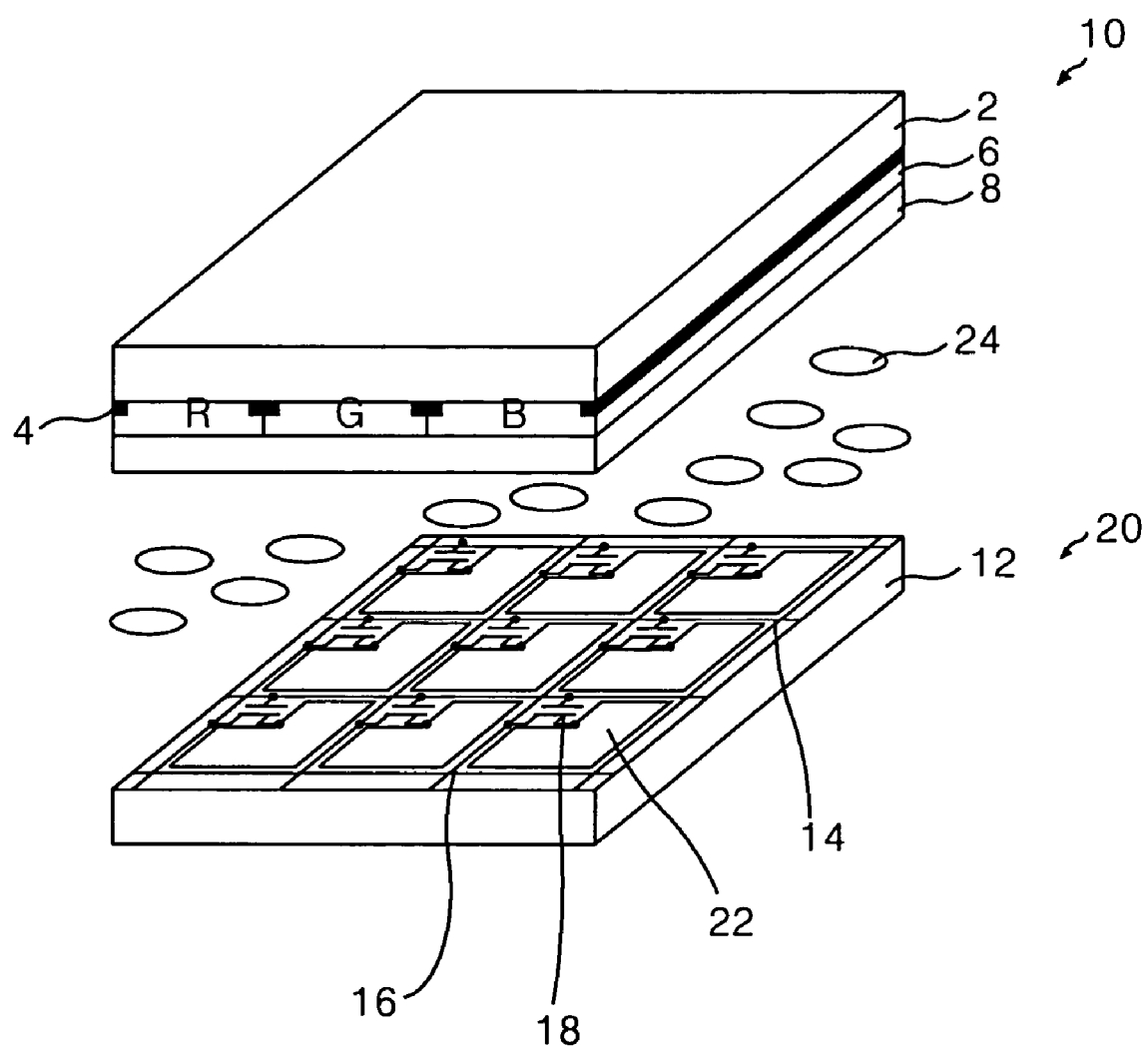
FIG. 1 is a schematic perspective view showing a structure of a related art liquid crystal display panel.
Figure 2A:
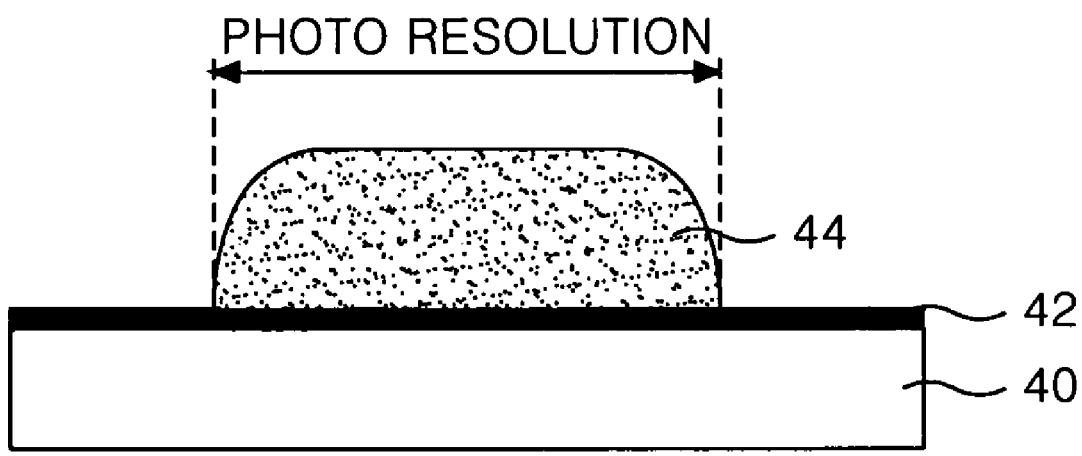
FIG. 2A to FIG. 2C are sectional views showing a method of forming a related art transparent electrode.
Figure 2B:
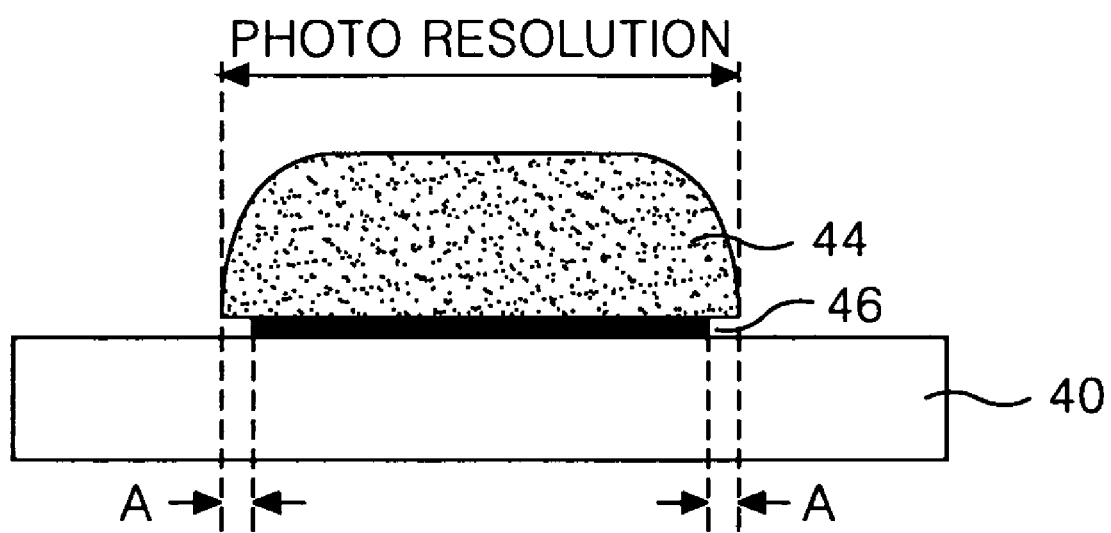
Figure 2C:
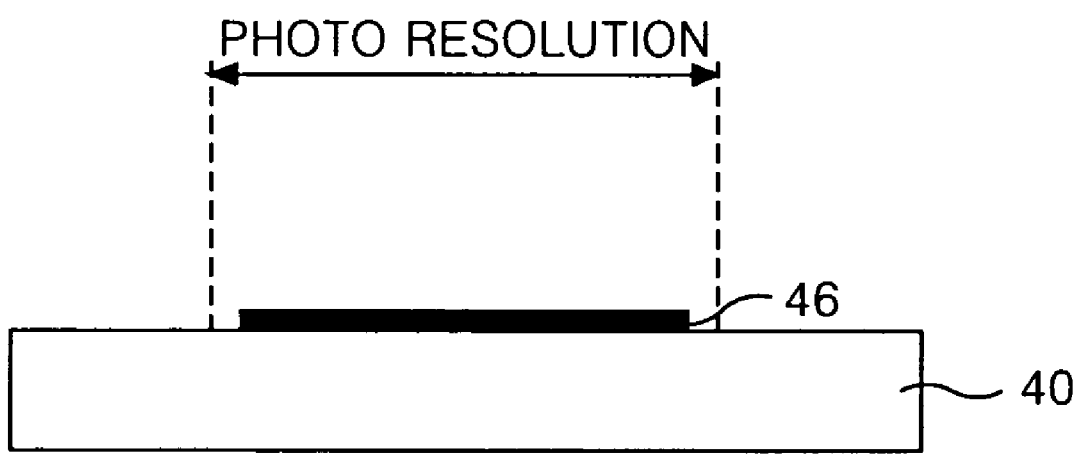
Figure 3A:
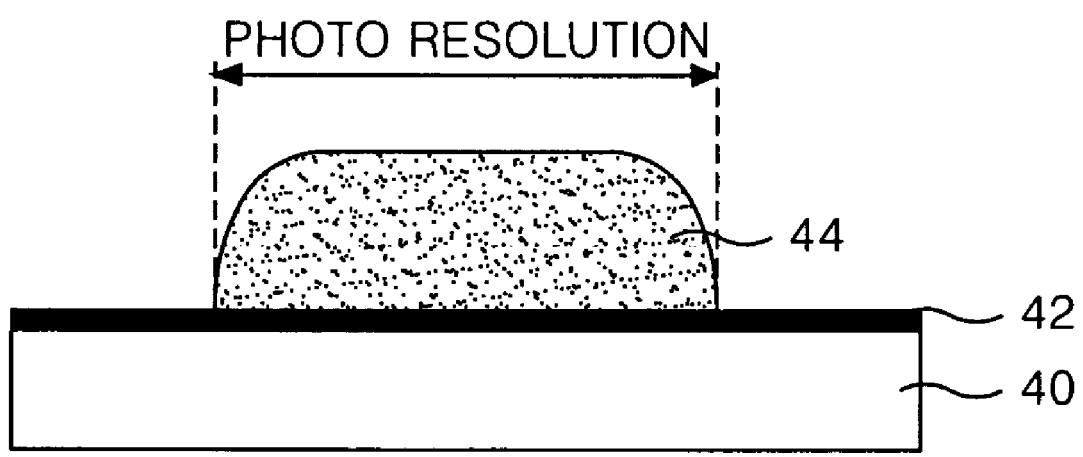
FIG. 3A to FIG. 3C are sectional views showing a method of forming transparent electrode according to an embodiment of the present invention.
Figure 3B:
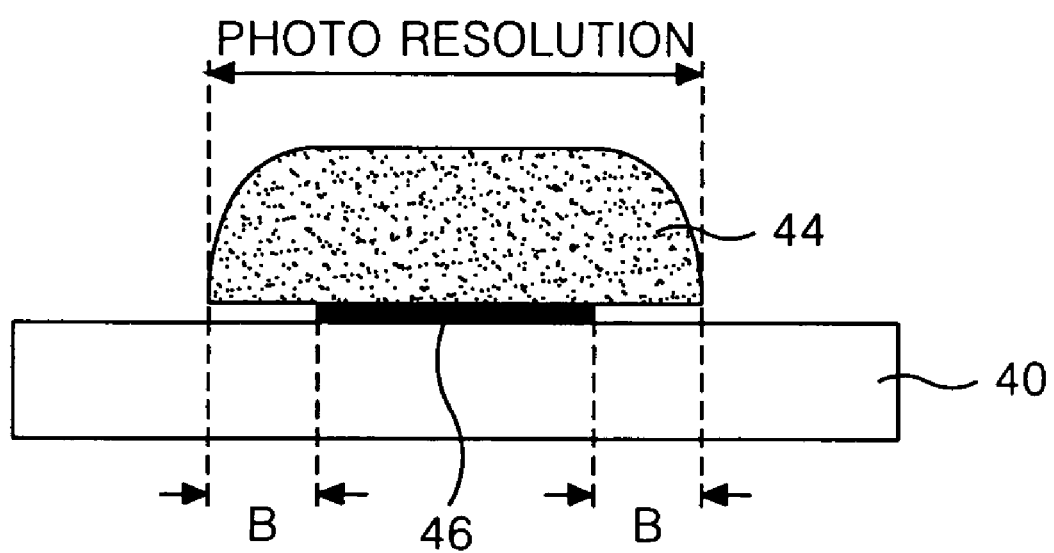
Figure 3C:
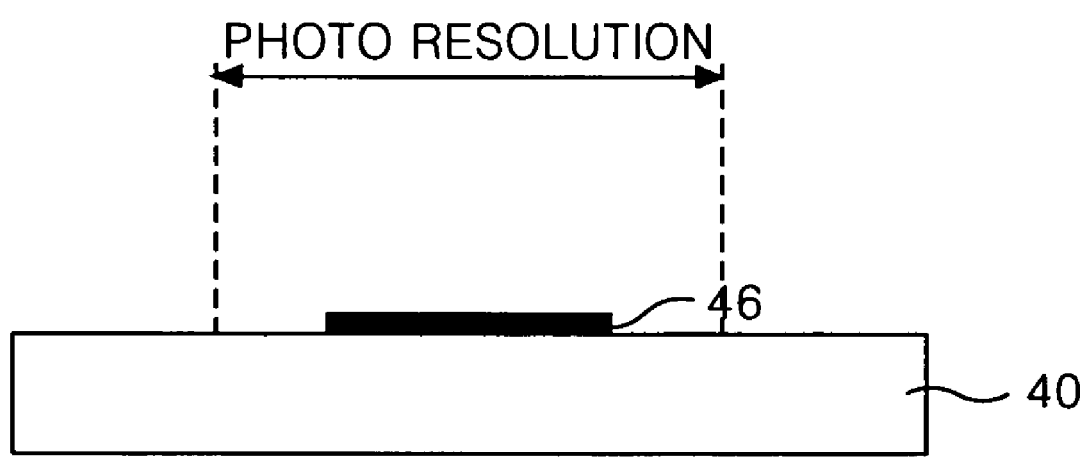

FIG. 3A to FIG. 3C are sectional views showing a method of forming transparent electrode according to an embodiment of the present invention.

Referring to FIG. 3A, the transparent conductive layer 42 is formed on a substrate 40, and a photo-resist pattern 44 is formed on the transparent conductive layer 42.

Referring to FIG. 3B and FIG. 3C, the transparent conductive layer 42 is etched by an etching process using the photo-resist pattern 44 as a mask to provide the transparent electrode 46, and the photo-resist pattern 44 is removed by a stripping process. In this case, the transparent conductive layer 42 is over-etched under the photo-resist pattern 44 by adjusting an etching process condition, so that it becomes possible to sharply reduce a line width of the transparent electrode 46. In other words, a distance between an edge portion of the photo-resist pattern 44 and an edge portion of the etched transparent electrode 46, that is, an etching CD bias B is enlarged by adjusting the etching process condition, so that it becomes possible to sharply reduce the line width of the transparent electrode 46 without limit of an exposure resolution. In this case, the etching CD bias B has a high dependence on temperature, so that an etching temperature is more highly set than a related art.

For example, if the transparent conductive layer 42 is formed of an amorphous ITO, then an etchant is provided in a spray mode, and the etching process is processed for 100~300 seconds on the condition of 50~70° C. In this case, the etchant basically comprises an Oxalic Acid (2 wt %~10 wt %), and an etchant in which a surfactant reducing an surface tension is added to the Oxalic Acid. Accordingly, the etching CD bias B of the amorphous ITO is more highly set than the CD bias (less than approximately 0.3 μm) of a related art etching process, so that the line width of the transparent electrode 46 may be reduced to 1 μm level.

Figure 4A:
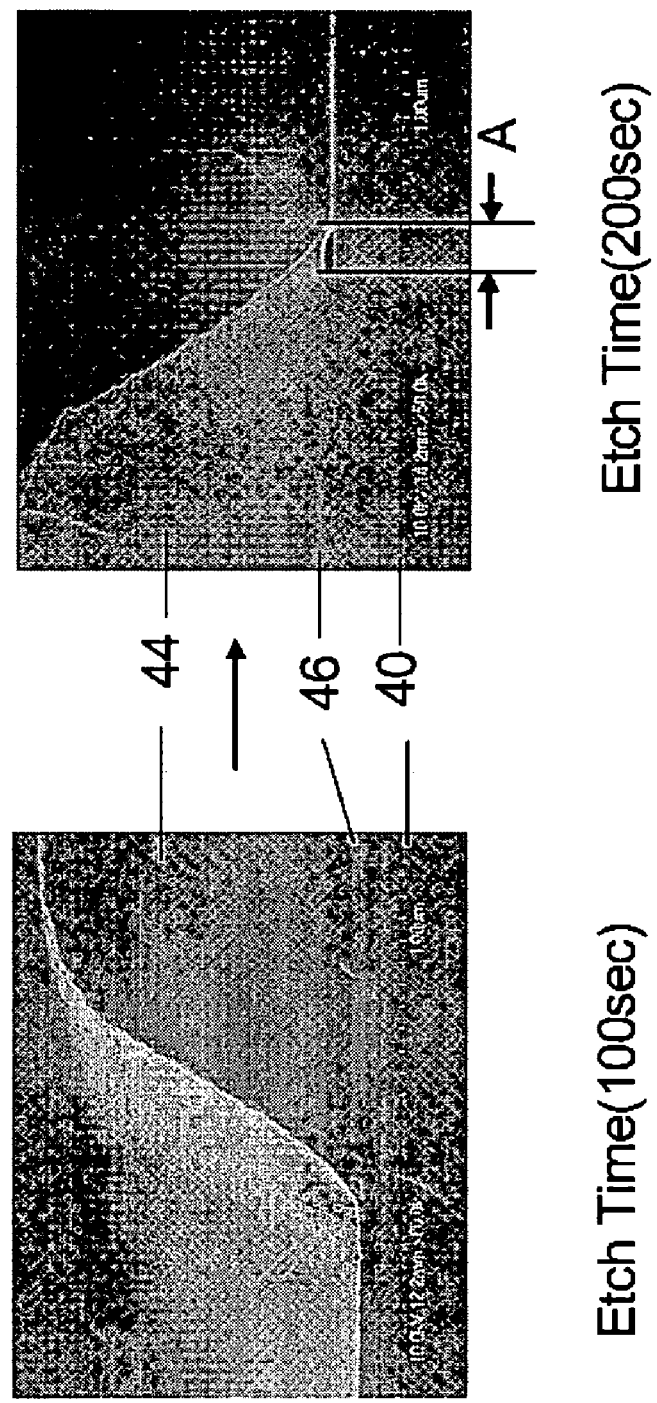

FIG. 4A is a photograph showing a process in which the transparent electrode 46 is formed by a related art etching process, and FIG. 4B is a photograph showing a process in which the transparent electrode 56 is formed by an etching process according to the present invention.

Specifically, FIG. 4A is a photograph showing the etching CD bias A between the photo-resist pattern 44 and the transparent electrode 46 at 100 seconds and 200 seconds for a related art etching process, that is, the amorphous ITO is etched by using an etchant provided in the spray mode at the etching temperature of 40° C.

FIG. 4B is a photograph showing the etching CD bias B between the photo-resist pattern 44 and the transparent electrode 56 at 100 seconds and 200 seconds for an etching process according to the present invention, that is, the amorphous ITO is etched by using an etchant provided in the spray mode at the etching temperature of 60° C.

And, experiment data in which the etching CD biases A and B are measured depending upon an etching temperature and an etching time, are shown in Table. 1.

TABLE 1

| CD bias of the transparent electrode | | | |
| --- | --- | --- | --- |
| Temperature/Time | 100 seconds | 200 seconds | 300 seconds |
| 40° C. | 0.2 μm | 0.4 μm | 0.6 μm |
| 50° C. | 0.4 μm | 0.8 μm | 1.2 μm |
| 60° C. | 1.0 μm | 2.0 μm | 3.0 μm |

Referring to Table. 1, as shown in FIG. 4A, if a related art etching process is processed at 40° C. for 100~200 seconds, then the CD bias A of the transparent electrode 46 is 0.2~0.4 μm while as shown in FIG. 4B, if the etching process according to the present invention is processed at 60° C. for 100~200 seconds, then the CD bias B of the transparent electrode 56 is approximately 1 μm~2 μm. In the present invention, if a minimum line width of the photo-resist pattern is 4 μm corresponding to the exposure resolution, then the line width of the transparent electrode 56 may be reduced to 1~3.5 μm.

When such a method of forming fine pattern is adopted in a method of forming an electrode of a liquid crystal display device of horizontal electric field, the line width of the common electrode and the pixel electrode formed in the pixel area may be reduced from a related art 4 μm level to 1~3.5 μm level. Accordingly, it becomes possible to increase the aperture ratio and improve the brightness.

Hereinafter, the liquid crystal display device of horizontal electric field using the method of forming fine pattern and the fabricating method thereof according to the present invention will be described.

Figure 5:
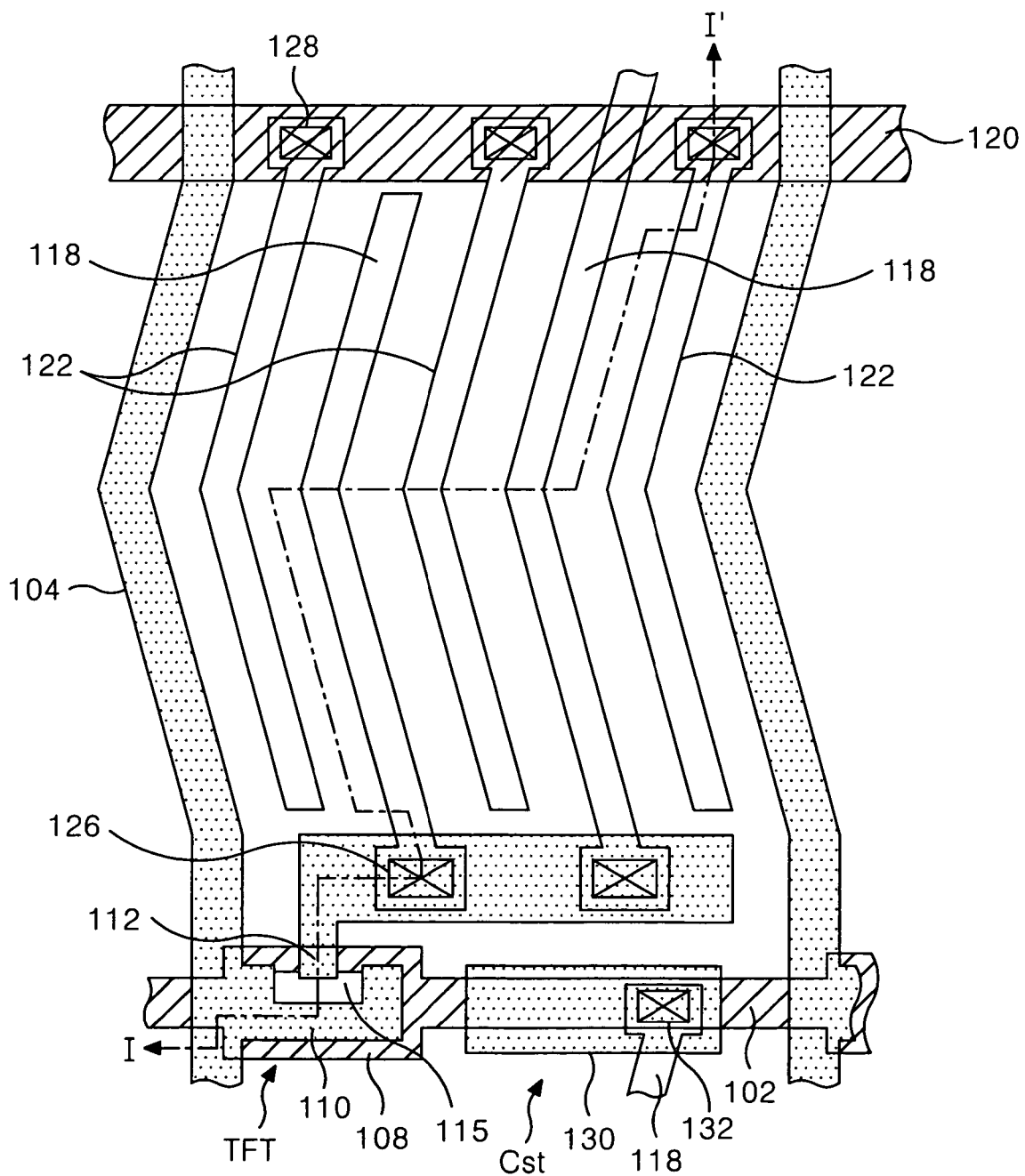
FIG. 5 is a plan view showing a thin film transistor substrate of a liquid crystal display device according to one embodiment of the present invention.
Figure 6:
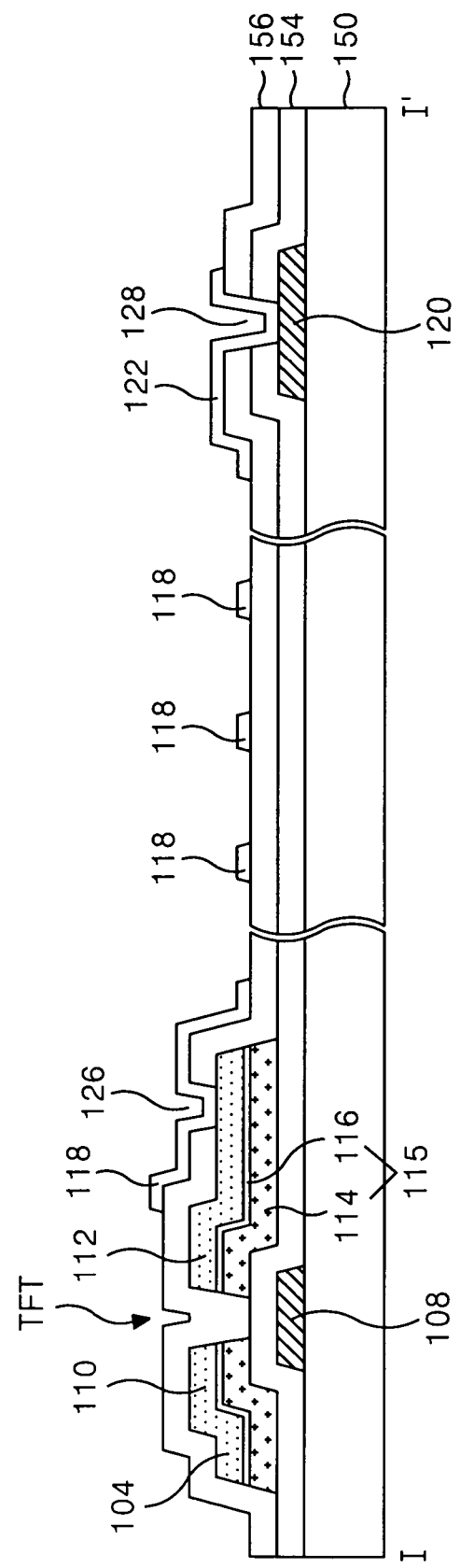
FIG. 6 is a sectional view of the thin film transistor substrate taken along I-I' lines in FIG. 5.

FIG. 5 is a plan view showing a thin film transistor substrate of a liquid crystal display device according to one embodiment of the present invention, and FIG. 6 is a sectional view of the thin film transistor substrate taken along I-I' lines in FIG. 5.

Referring to FIG. 5 and FIG. 6, the thin film transistor substrate of horizontal electric field applying type includes a gate line 102 and a data line 104 provided on a lower substrate 150 in such a manner as to intersect each other with a gate insulating film 154 therebetween and define a pixel area, a thin film transistor TFT connected to the gate line 102, the data line 104, a pixel electrode 118, the pixel electrode 118 and a common electrode 122 for forming a horizontal electric field at said pixel area, a common line 120 connected to the common electrode 122, and a storage capacitor Cst connected to the pixel electrode 118.

The gate line 102 supplies a scanning signal from a gate driver (not shown) while the data line 104 supplies a video signal from a data driver (not shown). The gate line 102 and the data line 104 cross each other with a gate insulating film 154 therebetween to define each pixel area.

The thin film transistor TFT allows a video signal applied to the data line 104 to be charged into a pixel electrode 118 and be kept in response to a scanning signal applied to the gate line 102. To this end, the thin film transistor TFT includes a gate electrode connected to the gate line 102, a source electrode 110 connected to the data line 104, a drain electrode 112 positioned in opposition to the source electrode 110 to be connected to a pixel electrode 118, an active layer 114 overlapping the gate electrode 108 with the gate insulating film 154 therebetween to define a channel between the source electrode 110 and the drain electrode 112, and an ohmic contact layer 116 for forming an ohmic contact with an active layer 114, the source electrode 110 and the drain electrode 112. A semiconductor pattern 115 including an active layer 114 and an ohmic contact layer 116 is also overlapped with a data line 114 and an upper storage electrode 130.

The common line 120 supplies, via the common electrode 122, a reference voltage for driving the liquid crystal, that is, a common voltage to each pixel. The common electrode 122 is formed in parallel to the pixel electrode 118 at pixel area and is connected, via a contact hole 128, to the common line 120. For example, as shown FIG. 5, the common electrode 122 and the pixel electrode 118 may be formed in a zigzag manner along with the data line 104. Also, the common electrode 122 and the pixel electrode 118 may be formed in a stripe manner along with the data line 104 as well as in a diverse manner. The common electrode 122 and the pixel electrode 118 may be formed in a zigzag manner, and the data line 104 may be formed in a stripe manner.

The pixel electrode 118 is formed in parallel to the common electrode 122 and is connected, via a contact hole 126, to the drain electrode 112. If a video signal is applied, via the thin film transistor, to the pixel electrode 118, then a horizontal electric field is formed between the finger portion of the pixel electrode 118 and the finger portion of the common electrode 122 supplied with the common voltage. Liquid crystal molecules arranged in the horizontal direction between the thin film transistor array substrate and the color filter array substrate by such a horizontal electric field is rotated due to a dielectric anisotropy. Transmittance of a light transmitting the pixel area is differentiated depending upon a rotation extent of the liquid crystal molecules, thereby implementing a gray level scale.

The storage capacitor Cst is provided such that a pre-stage gate line 102 overlaps with an upper storage electrode 130 with the gate insulating film 154 and the semiconductor pattern 115 therebetween. The upper storage electrode 130 is connected, via a contact hole 132, to the pixel electrode 118. The storage capacitor Cst allows a video signal charged in the pixel electrode 118 to be stably maintained until the next signal is charged.

A method of fabricating a thin film transistor substrate having such configuration will be described.

A first conductive pattern group including the gate line 102, the gate electrode 122 and the common line 120 is formed by patterning after a first conductive layer is formed on a substrate 150.

And, after the gate insulating film 154, a semiconductor layer and a second conductive layer are disposed, the semiconductor layer and the second conductive layer are patterned, thereby providing the semiconductor pattern 115 including the active layer 114 and the ohmic contact layer 116, and a second conductive pattern group including the data line 104, the source electrode 110, the drain electrode 112 and the upper storage electrode 130 overlapped on the semiconductor pattern 115. Herein, the semiconductor pattern 115 and the second conductive pattern group may be provided by using a separate mask process.

Next, the protective film 156 is formed and patterned to provide the contact hole 126, 128 and 132.

And, a transparent conductive layer is formed and patterned on the protective film 156 to provide the common electrode 122 and the pixel electrode 118.

In the method of fabricating such thin film transistor substrate, at least one of the common electrode 122 and the pixel electrode 118 is formed by the method of forming fine pattern according to the present invention. In this case, at least one of the common electrode 122 and the pixel electrode 118, that is, a finger portion line width of the electrode is reduced from a related art 4 μm level to 1~3.5 μm level, so that it becomes possible to improve a brightness. Hereinafter, for an explanation convenience sake, there will be described in detail only a case in which the common electrode 122 and the pixel electrode 118 is formed by the method of forming fine pattern of the present invention.

Figure 7A:
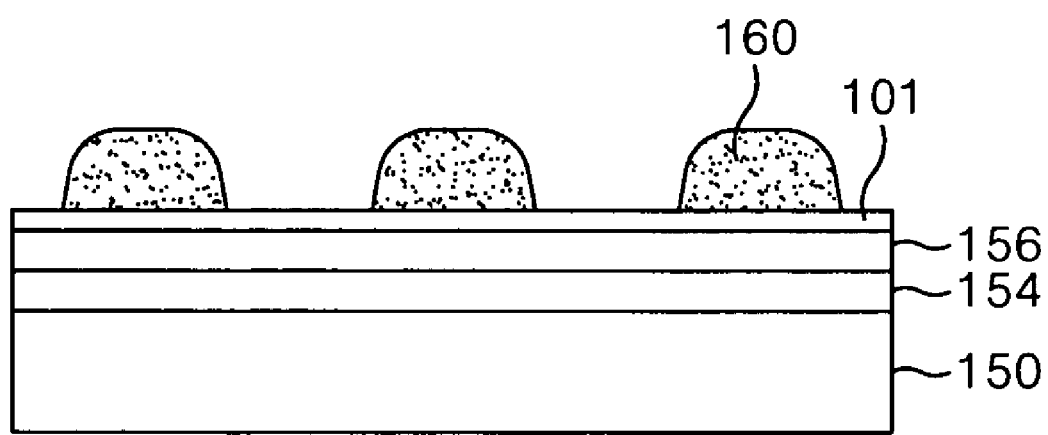
FIG. 7A to FIG. 7C are sectional views showing the method of forming the pixel electrode and the common electrode in FIG. 6.

Referring to FIG. 7A, the transparent conductive layer 101 is formed on the substrate 150 disposed with the gate insulating film 154 and the protective film 156 by a deposition technique such as a sputtering, etc., and a photo-resist pattern 160 is formed on the transparent conductive layer 101 by the photolithography process.

Figure 7B:
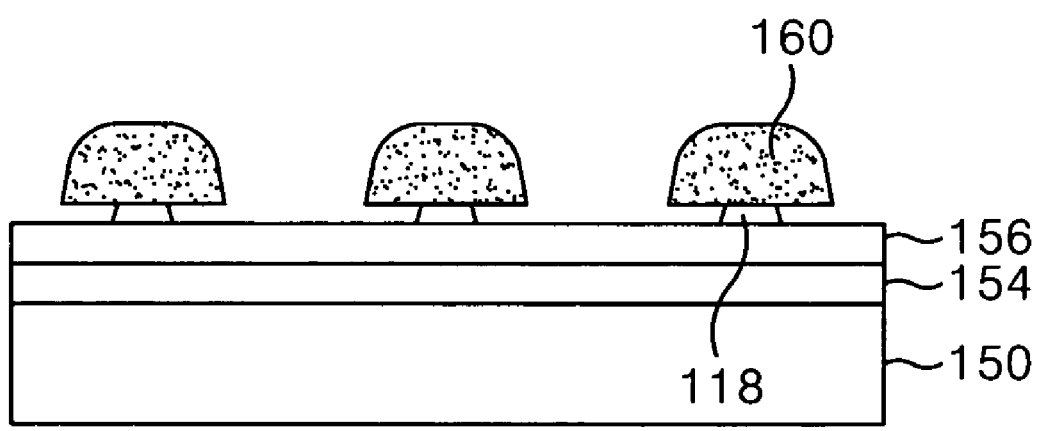
Figure 7C:
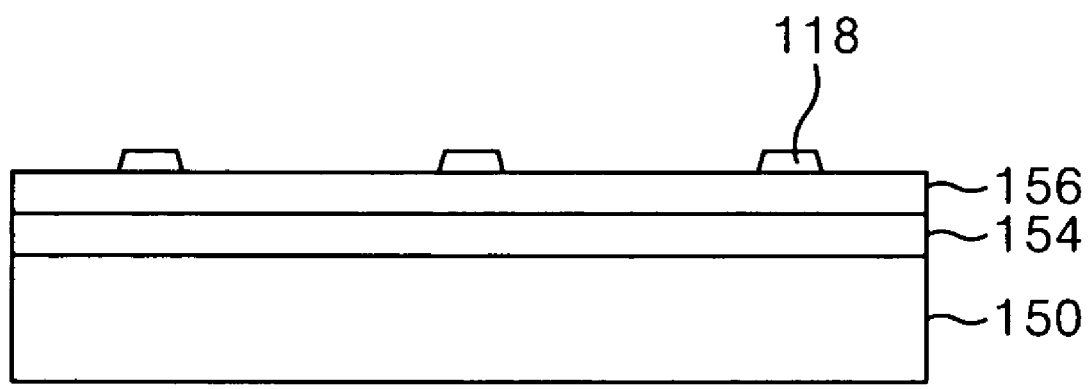

Referring to FIG. 7B and FIG. 7C, the transparent conductive layer 101 is etched by an etching process using the photo-resist pattern 160 as a mask to provide the common electrode 122 and the pixel electrode 118, and the left photo-resist pattern 160 is removed by the stripping process. In this case, the etching CD bias of the transparent conductive layer 101 is enlarged, that is, the transparent conductive layer 101 is over-etched, so that the common electrode 122 and the pixel electrode 118 have a line width narrower than the photo-resist pattern 160. For example, if the transparent conductive layer 42 is formed of an amorphous ITO, then an etchant is provided in a spray mode, and the etching process is processed for 100~300 seconds on the condition of 50~70° C. In this case, the etchant basically comprises an Oxalic Acid (2 wt %~10 wt %), and an etchant in which a surfactant reducing an surface tension is added to the Oxalic Acid. Accordingly, the etching CD bias B of the amorphous ITO is more highly set than a related art etching process, so that the line width of the common electrode 122 and the pixel electrode 118 may be reduced to 1~3.5 μm level. And, a thickness of the common electrode 122 and the pixel electrode 118 is increased compared to a related art in order to compensate a resistance generated by narrowing the line width of the common electrode 122 and the pixel electrode 118 to be profitable.

On the other hand, if a horizontal electric field is formed by the pixel electrode 118 and the common electrode 122, then an area positioned inwardly about 0.8 μm from each side edge portion of a transparent pixel electrode 118 and the common electrode 122 is affected by the horizontal electric field. Thus, a liquid crystal thereon is drove so that it becomes possible to contribute the brightness. Accordingly, the entire pixel electrode 118 and the entire common electrode 122 transmit a light up to an approximately 1.6 μm line width, so that it becomes possible to contribute the brightness. On the other hand, if a line width of the pixel electrode 118 and the common electrode 122 is more than 1.6 μm, a middle portion except for 0.8 μm from each side is not almost affected by the horizontal electric field. Thus, a liquid crystal thereon is not properly drove, so that it becomes possible to cause a light leakage. Accordingly, if the finger portion of the pixel electrode 118 is formed to have a value less than 1.6 μm, then the brightness and a contrast ratio may be increased. Also, the line width having a value between 1 μm and 1.6 μm is maintained owing to a driving characteristic of the common electrode 122 and the pixel electrode 118 to be profitable.

As described above, in a method of forming fine pattern of the present invention, the thin film pattern having a line width narrower than the exposure resolution without limit of an exposure resolution is formed by an over-etching process.

Also, in a liquid crystal display device of horizontal electric field applying type and a fabricating method thereof according to the present invention, at least one of a common electrode and a pixel electrode is formed in such a manner as to have a 1~3.5 μm level line width by the method of forming fine pattern, so that it becomes possible to increase an aperture ratio and improve a brightness. Specifically, in the liquid crystal display device of horizontal electric field applying type and the fabricating method thereof according to the present invention, if at least one of the common electrode and the pixel electrode is formed to have a 1 μm level line width, a light leakage generated at a middle portion of an electrode is prevented, so that it becomes possible to improve the contrast ratio.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A method of forming fine pattern, comprising:
   forming a photo-resist pattern on a conductive layer, the photo-resist pattern having a minimum line width corresponding to an exposure resolution of an exposure device; and
   over-etching the conductive layer by an etching process using the photo-resist pattern as a mask to form an electrode pattern having a line width narrower than the exposure resolution of the exposure device,
   wherein the step of over-etching the conductive layer performs etching so that a etching CD (Critical Dimension) bias between the photo-resist pattern and the electrode pattern is approximately 0.4~3 μm,
   wherein a temperature of the etching process is between about 50° C. and about 70° C., and
   wherein an etching process time is between about 100 seconds and about 300 seconds.

2. The method as claimed in claim 1, wherein the electrode pattern has an approximately 1~3.5 μm line width.

3. The method as claimed in claim 1, wherein the conductive layer includes a transparent conductive layer.

4. The method as claimed in claim 1, wherein the conductive layer includes ITO.

5. The method as claimed in claim 1, wherein the conductive layer includes at least one of a common electrode and a pixel electrode formed in the electrode pattern with an approximately 1~1.6 μm line width.

6. The method as claimed in claim 1, wherein an etchant for etching the conductive layer includes an oxalic acid of 2 wt %~10 wt % and a surfactant.

7. The method as claimed in claim 6, wherein the etchant is provided in a spray mode.

8. A method of fabricating a liquid crystal display device,
   forming a conductive layer;
   forming a photo-resist pattern on the conductive layer, the photo-resist pattern including a portion having a minimum line width corresponding to an exposure resolution of an exposure device; and
   over-etching the conductive layer by an etching process using the photo-resist pattern as a mask to form an electrode pattern having a line width narrower than the exposure resolution of the exposure device,
   wherein the step of over-etching the conductive layer performs etching so that a etching CD (Critical Dimension) bias between the photo-resist pattern and the electrode pattern is an approximately 0.4~3 μm,
   wherein a temperature of the etching process is between about 50° C. and about 70° C., and wherein an etching process time is between about 100 seconds and about 300 seconds.

9. The method as claimed in claim 8, wherein the electrode pattern has an approximately 1~3.5 μm line width.

10. The method as claimed in claim 8, wherein the conductive layer includes a transparent conductive layer.

11. The method as claimed in claim 10, wherein the conductive layer includes ITO.

12. The method as claimed in claim 8, wherein an etchant for etching the conductive layer includes an oxalic acid of 2 wt %~10 wt % and a surfactant.

13. The method as claimed in claim 12, wherein the etchant is provided in a spray mode.

14. The method as claimed in claim 8, wherein the conductive layer includes at least one of a common electrode and a pixel electrode formed in the electrode pattern with an approximately 1~1.6 μm line width.

15. The method as claimed in claim 14, wherein the common electrode and the pixel electrode form a horizontal electric field.

* * * * *